(12) United States Patent
Nielsen

(10) Patent No.: US 6,945,136 B2
(45) Date of Patent: Sep. 20, 2005

(54) AERODYNAMIC BICYCLE HANDLEBARS

(76) Inventor: Peter M. Nielsen, 21 Nut Island Ave., Quincy, MA (US) 02169

( * ) Notice: Subject to any disclaimer, the term of this patent is extended or adjusted under 35 U.S.C. 154(b) by 78 days.

(21) Appl. No.: 10/129,087
(22) PCT Filed: Sep. 4, 2001
(86) PCT No.: PCT/US01/41987
§ 371 (c)(1), (2), (4) Date: Aug. 8, 2002
(87) PCT Pub. No.: WO02/20340
PCT Pub. Date: Mar. 14, 2002

(65) Prior Publication Data
US 2003/0089191 A1 May 15, 2003

Related U.S. Application Data

(60) Provisional application No. 60/230,279, filed on Sep. 6, 2000.

(51) Int. Cl.[7] ............................................... B62K 21/16
(52) U.S. Cl. ................................................... 74/551.5
(58) Field of Search .................... 280/279; 74/551.1, 74/551.3, 551.4, 551.5, 551.6, 551.7

(56) References Cited

U.S. PATENT DOCUMENTS

| | | | | |
|---|---|---|---|---|
| 332,263 A | * | 12/1885 | Laughlin | 280/264 |
| 358,533 A | * | 3/1887 | Bierau | 74/551.4 |
| 527,576 A | * | 10/1894 | Woodard | 74/551.5 |
| 4,361,057 A | | 11/1982 | Kochera | |
| 4,384,497 A | * | 5/1983 | Gatsos | 74/551.4 |
| 4,420,989 A | * | 12/1983 | Finkle | 74/551.2 |
| 4,682,509 A | * | 7/1987 | Takamiya et al. | 74/551.4 |
| 4,748,928 A | * | 6/1988 | Nakamura | 114/144 R |
| 5,555,775 A | * | 9/1996 | D'Alusio et al. | 74/551.5 |
| 5,737,967 A | * | 4/1998 | Hartley | 74/551.3 |

FOREIGN PATENT DOCUMENTS

| | | | |
|---|---|---|---|
| DE | 154514 | | 9/2003 |
| FR | 2 762 283 | * | 4/1997 |
| IT | 454393 | | 1/1950 |

* cited by examiner

Primary Examiner—Chong H. Kim
(74) Attorney, Agent, or Firm—Pandiscio & Pandiscio

(57) ABSTRACT

A pivoting handlebar assembly for a cycle is characterized by a pair of handlebars and a mechanical linkage system that permit the handlebars to be moved with relative ease from one to the other of a rearward outboard position and a forward inboard position while the cycle is in motion. The assembly includes means for assuring that the two handlebars will move in unison with one another relative to a central support. A trigger and cable-operated lock mechanism is provided for releasably locking the handlebars against pivotal movement.

26 Claims, 16 Drawing Sheets

US 6,945,136 B2

AERODYNAMIC BICYCLE HANDLEBARS

This application claims the benefit of U.S. Provisional Application No. 60/230,279, filed 6 Sep. 2000.

This invention relates to handlebars for cycling apparatus and more particularly to aerodynamic bicycle handlebars that are adapted to pivot while the cycle is in motion to permit different riding positions.

BACKGROUND OF THE INVENTION

Heretofore aerodynamic bicycle handlebars have comprised so-called "aero" bars located forward of standard "drop" handlebars, with pads being provided to support the rider's forearms and most of the upper body and head weight. The position of the aero bars and pads force the rider to assume a forward-leaning aerodynamic position. However, this narrow aerodynamic position is difficult to maintain at low speeds and when progressing through sharp turns, often requiring the rider to move his hands down to the drop handlebars in order to maintain control of the cycle.

The limitations of conventional aerodynamic bicycle handlebars have resulted in efforts to provide a single set of handlebars which are capable of pivoting between a first "drop" position and a second "aero" position. Such a device is illustrated and described in U.S. Pat. No. 5,737,967, issued 14 Apr. 1998 to James T. Hartley for "Pivoting Handlebars". However, the particular pivoting handlebar arrangement disclosed by the Hartley patent suffers from a number of limitations, one of which is that it lacks means for positively locking the handlebars in both its drop and aero limit positions while riding. Another limitation is that the brake and shift levers change position relative to the rider's hands as the unit is articulated.

OBJECTS AND SUMMARY OF THE INVENTION

The primary object of the invention is to provide pivoting aerodynamic handlebars for cycles that avoid the limitations of the handlebar design disclosed by Hartley U.S. Pat. No. 5,737,967, while offering the same advantage of the handlebars pivoting in unison to permit different riding positions.

Another object is to provide a pivoting handlebar assembly for a cycle that is capable of providing a stable support for the rider's hands and is characterized by a novel mechanical linkage that permits the handlebars to be moved from one to the other of a rearward outboard position and a forward inboard position while the cycle is in motion.

Still another object is to provide a pivoting handlebar assembly for a cycle that is sturdy and is designed to allow its handlebars to be pivoted with relative ease while the cycle is in motion.

A further object is to provide a pivoting handlebar assembly with a trigger and cable-operated lock mechanism for releasably locking the handlebars against pivotal movement.

The foregoing objects, and other objects rendered obvious by the drawings and the following detailed description, are attained by providing a pivoting handlebar assembly that comprises a central support subassembly that is adapted for ready and reliable attachment to a bicycle steering stem, a pair of rear struts having first (inner) ends pivotally attached to the central support subassembly, a pair of front struts having first (inner) ends pivotally attached to the central support subassembly, gear means attached to the first ends of the front struts and engaged with one another so as to assure that the front struts will pivot in unison with one another relative to the central support subassembly, a pair of handlebar carriers, each of the handlebar carriers extending between and being pivotally attached to second (outer) ends of the rear and front struts, and a pair of handlebars attached to the handlebar carriers, with the two pairs of rear and front struts being pivotable relative to the central support assembly so as to shift the handlebars from one to the other of a rearward and outboard "drop" position and a forward and inboard aerodynamic "aero" position. The handlebar apparatus also includes lock means carried by the central support subassembly for releasably locking the front struts in their outboard or inboard positions.

THE DRAWINGS

In the figures, like components are identified by like alphanumeric characters.

SPECIFIC DESCRIPTION OF THE INVENTION

Figure 1:
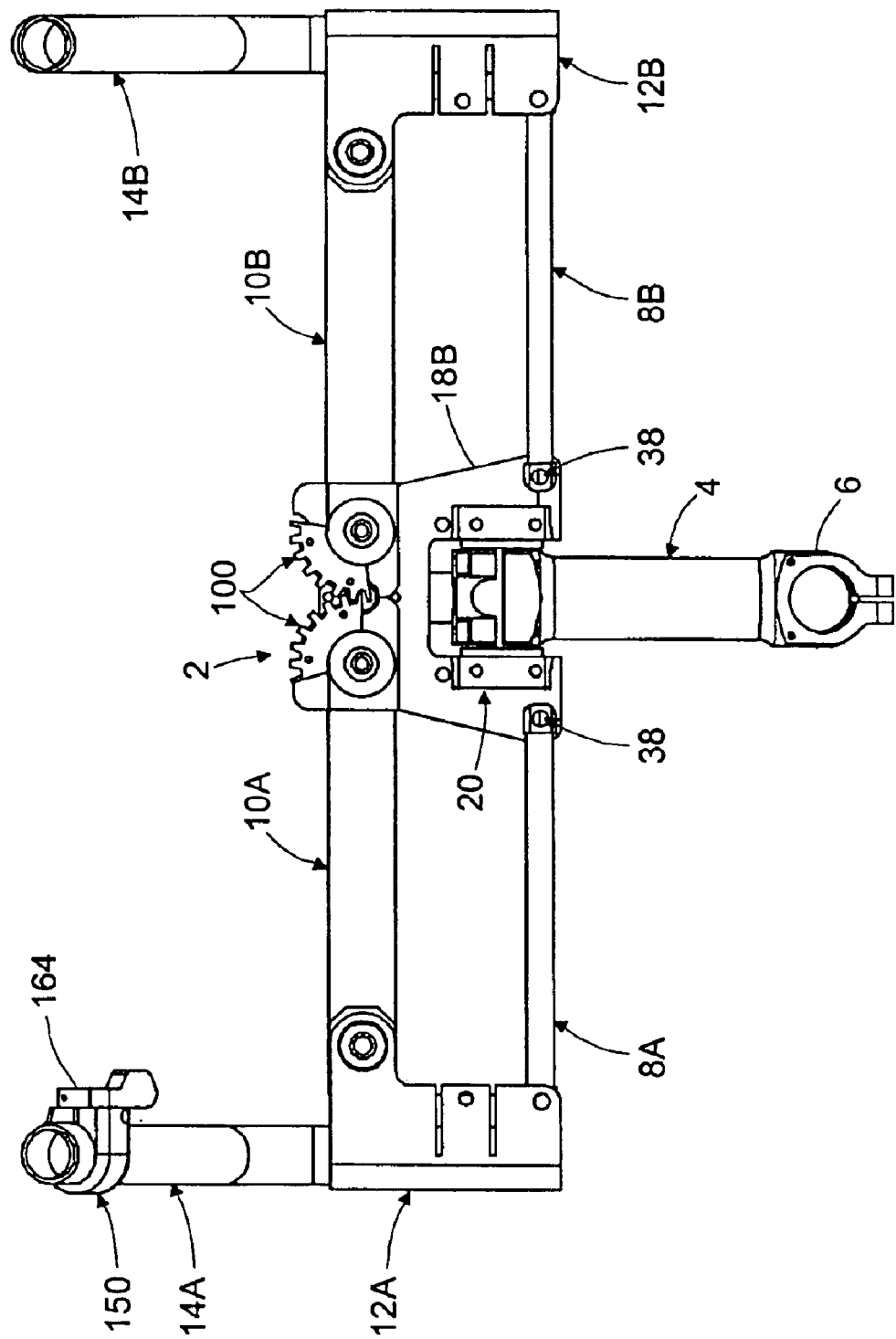
FIG. 1 is a plan view of a pivotal handlebar assembly constituting a preferred embodiment of the invention in its outboard or drop position (certain components, notably the cable release and lock mechanism are omitted from this view)
Figure 2:
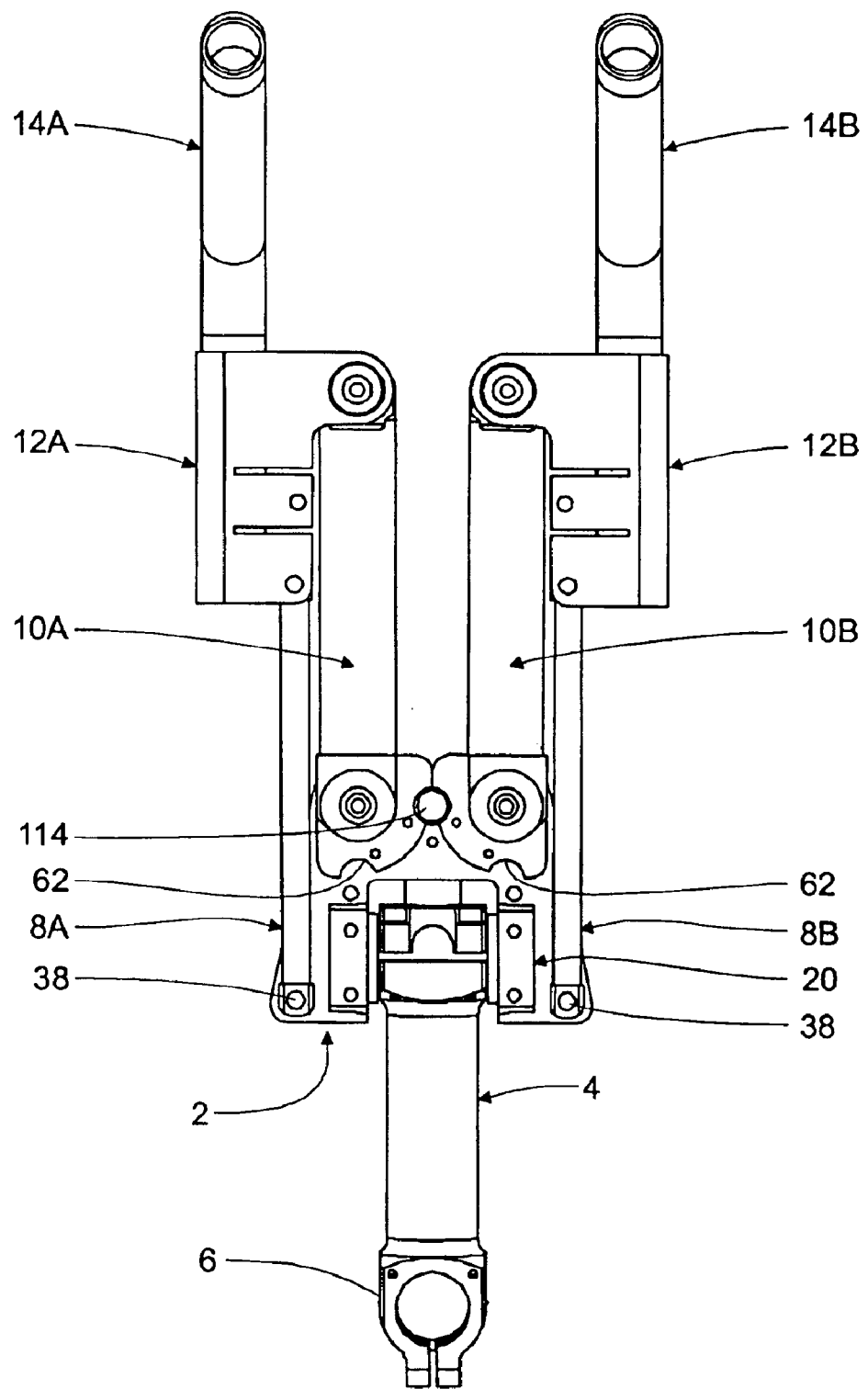
FIG. 2 is a plan view showing the apparatus of FIG. 1 in its inboard or aerodynamic position.
Figure 3:
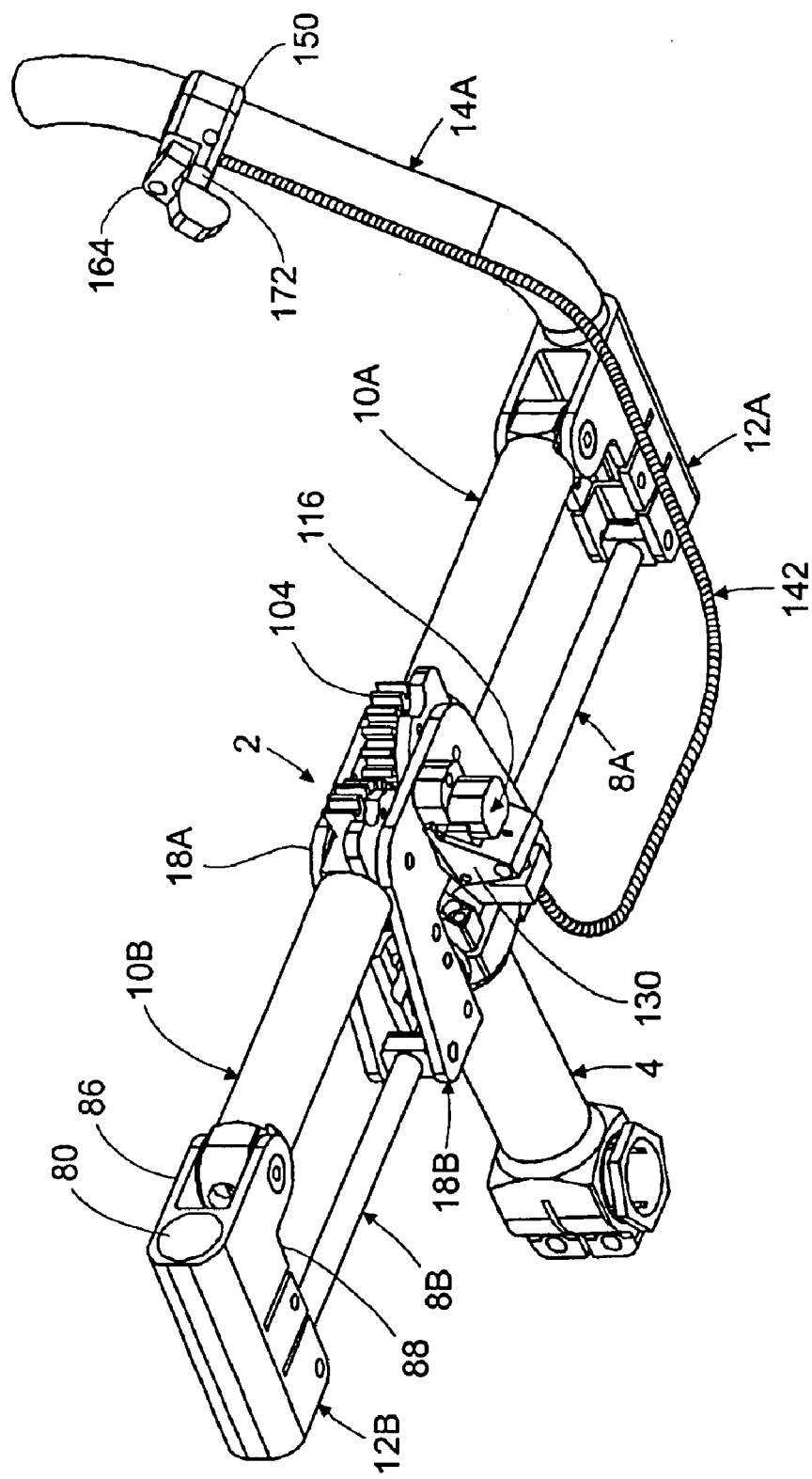
FIG. 3 is a perspective view looking at the underside of the apparatus shown in FIGS. 1 and 2 (the trigger and cable release are included in this view)

Referring to FIGS. 1–3, the pivoting handlebar assembly embodying the present invention comprises a central support subassembly 2, a pair of rear struts 8A and 8B, a pair of front struts 10A and 10B, a pair of handlebar mounts 12A and 12B, and a pair of handlebars 14A and 14B. The central support subassembly includes a carrier 20 that serves as a mount for attaching the handlebar assembly to a bicycle stem 4. The form of the bicycle stem is not critical to the invention. Preferably, but not necessarily, the bicycle stem is of the kind that has a split rear section 6 which is adapted to fit over and be clamped to a front wheel steering shaft (not shown).

Referring now to FIGS. 3–7 and 13, the central support subassembly comprises a pair of flat plates 18A and 18B of like configuration, plus the carrier 20 for interfacing with the handlebar stem 4. The plates 18A and 18B have a generally U-shaped configuration, comprising a slot 22 to permit access to the carrier 20 when the latter is attached to the two plates.

Figure 13:
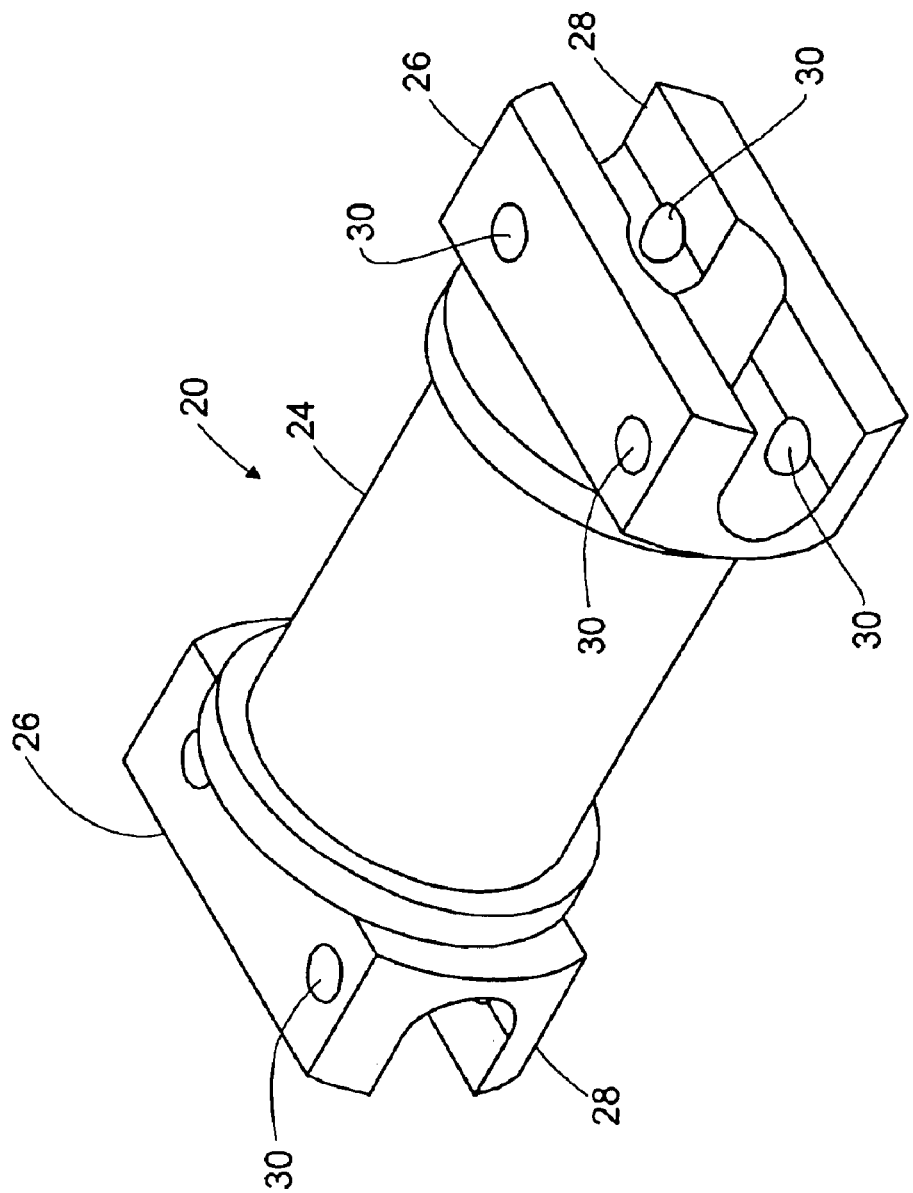
FIG. 13 is a perspective view of the carrier component of the central support subassembly for interfacing with the handlebar stem.

As seen best in FIG. 13, the carrier 20 comprises a cylindrical center section 24 and two oppositely-facing end sections each comprising upper and lower flanges 26 and 28. Each of these flanges is provided with tapped holes as shown at 30 for receiving screws, some of which are shown at 34 in FIGS. 5 and 6, for securing the carrier to and between the two plates 18A and 18B. The latter plates are provided with holes 32 to accommodate the screws 34 that secure them to carrier 20.

Figure 4:
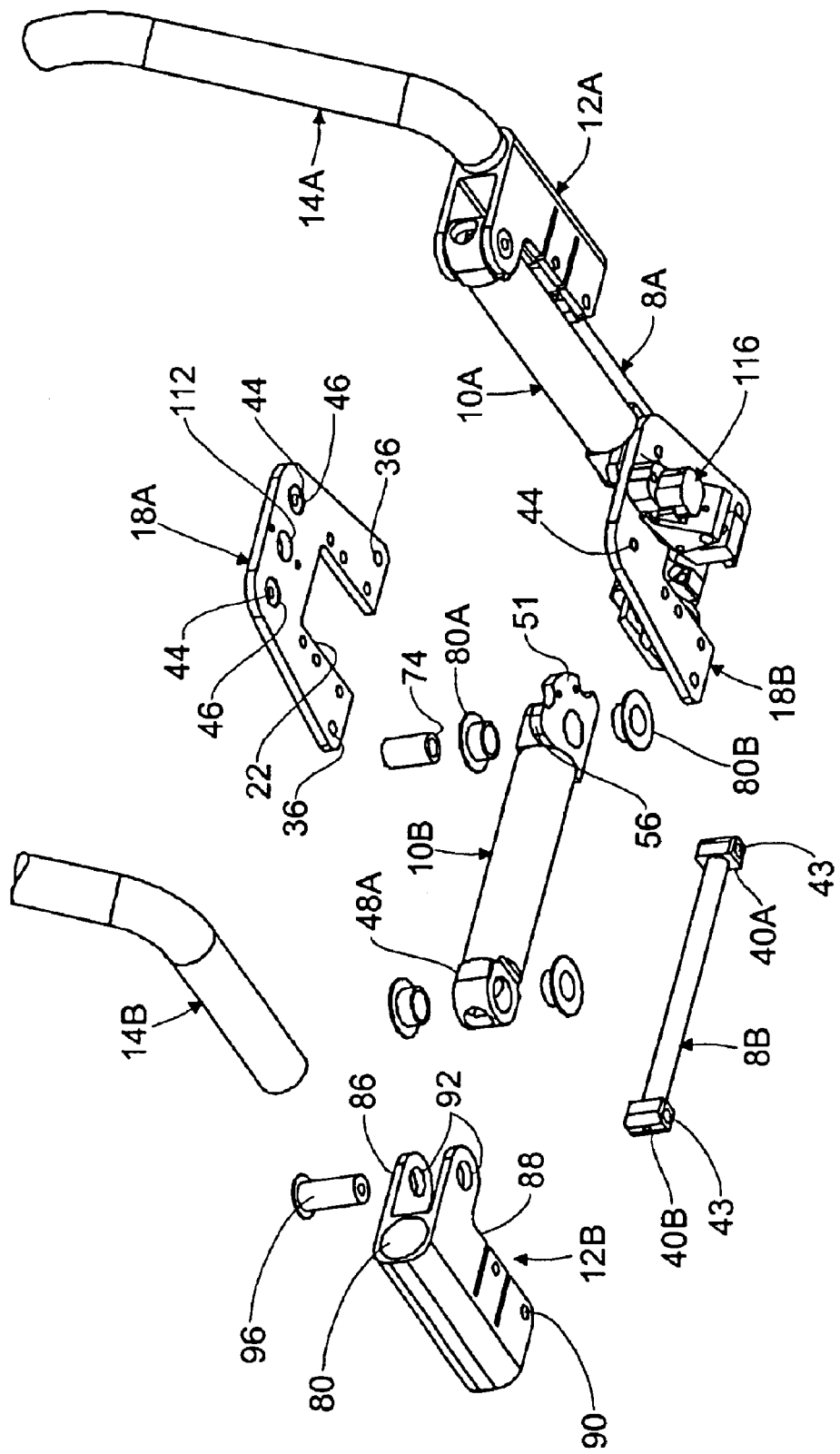
FIG. 4 is a partially exploded perspective view of the underside of the same apparatus, with one handlebar in its outboard position and the other handlebar in its inboard position.
Figure 5:
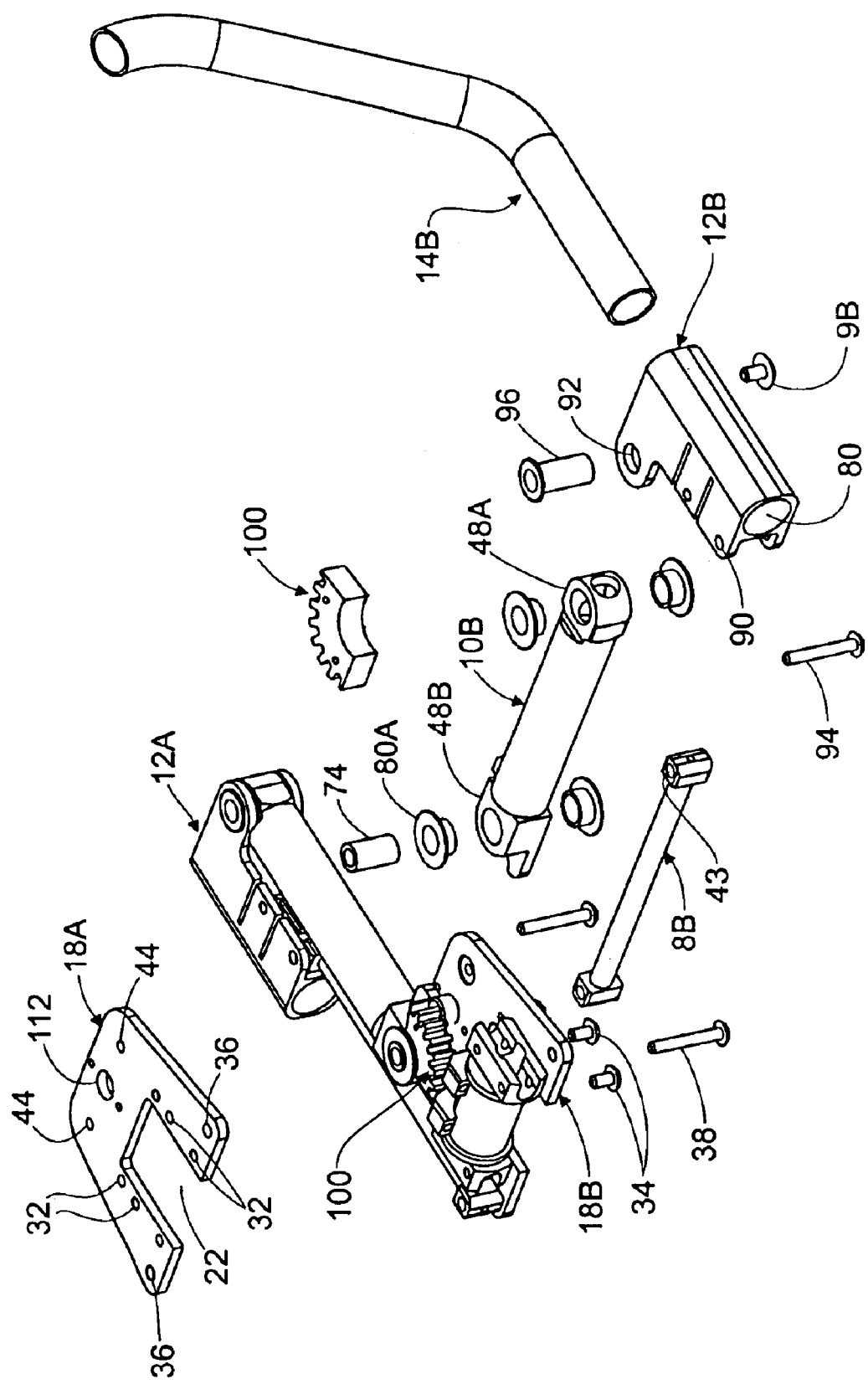
FIG. 5 is a partially exploded perspective view similar to FIG. 4 looking at the upper side of the same apparatus.
Figure 6:
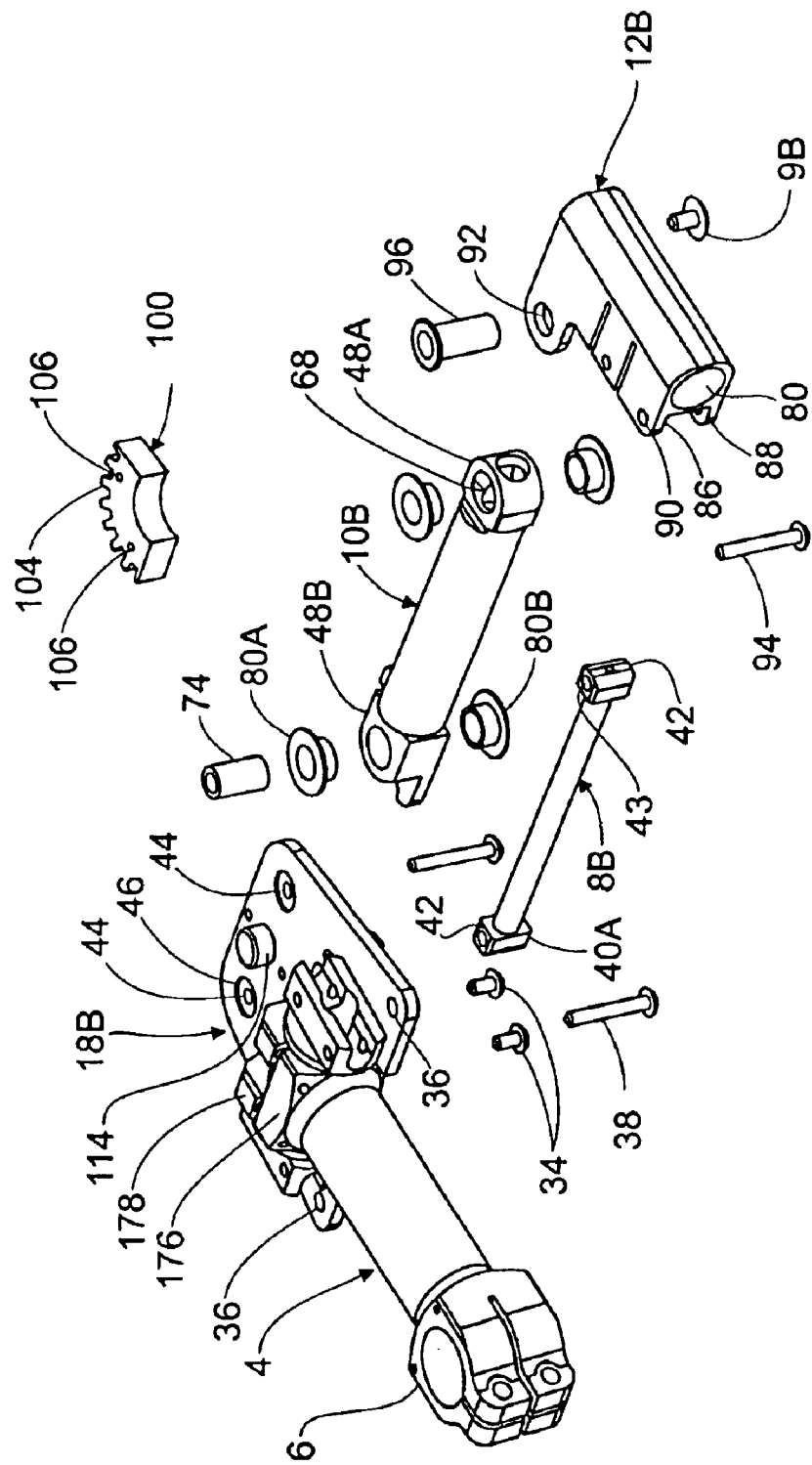
FIG. 6 is a fragmentary partially exploded perspective view similar to FIG. 5, but with certain components omitted and the handlebar stem attached.

Still referring to FIGS. 4–7, the plates 18A and 18B are provided with a first pair of pivot holes 36 for accommodating pivot pins 38 for pivotally securing the rear struts 8A and 8B to the support subassembly 2. The rear struts 8A and 8B have tubular right angle end sections 40A and 40B each having flat opposite end surfaces 42 and pivot holes 43. The end sections 40A extend between the two plates 18A and 18B and holes 43 are sized to accept pivot pins 38 (FIGS. 5 and 6) which have threaded ends for securing the struts to the two plates. Nuts (not shown) are screwed onto the ends of pivot pins 38 to secure them in place. Plates 18A and 18B also have pivot holes 44 for pivotally mounting the front struts 10A and 10B. As seen in FIGS. 4 and 6, the holes 44 are counterbored on the underside of plate 18A and on the upper side of plate 18B, the counterbores being identified by the numeral 46.

Figure 8:
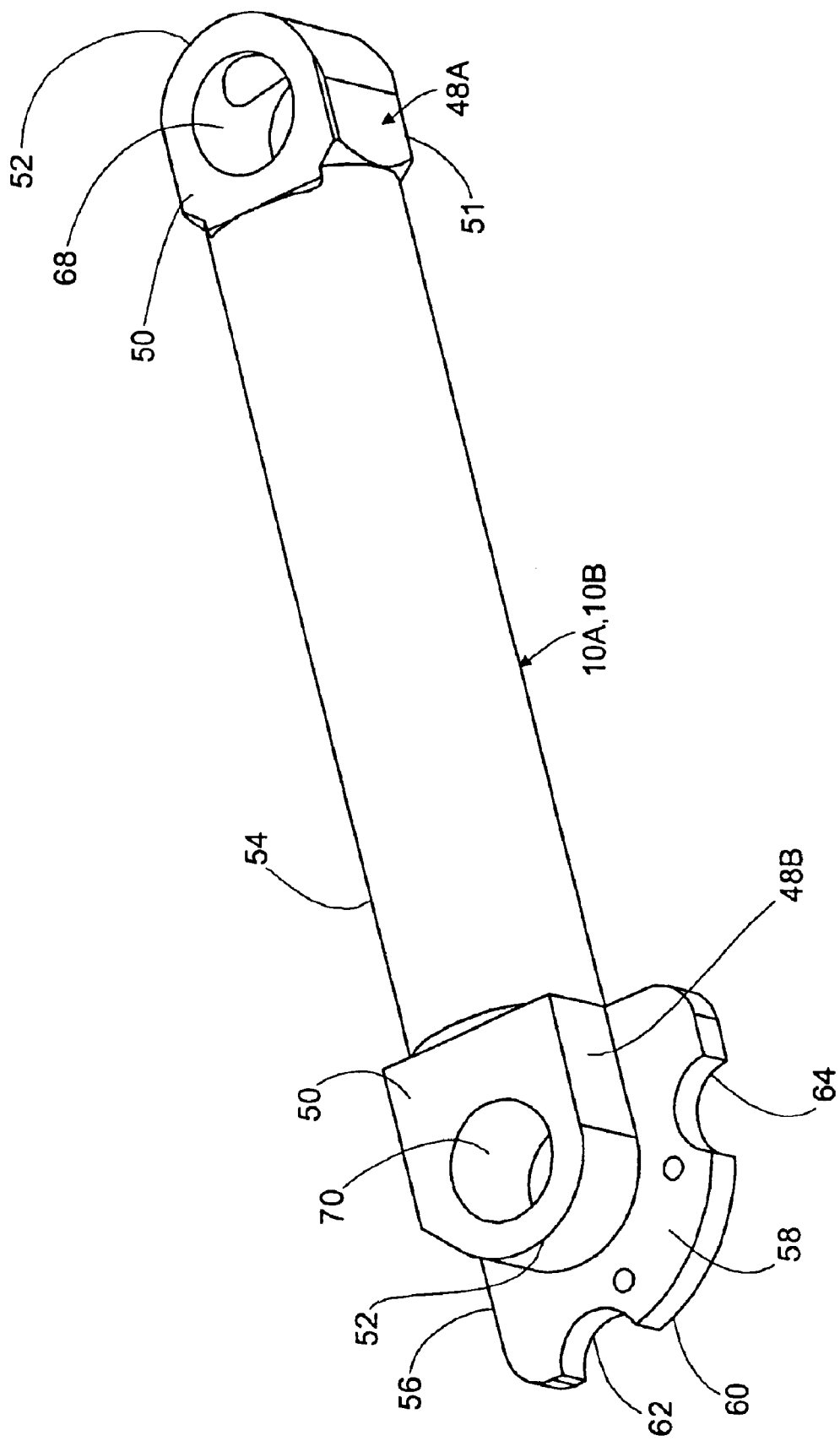
FIG. 8 is an enlarged perspective view of one of the front struts.
Figure 9:
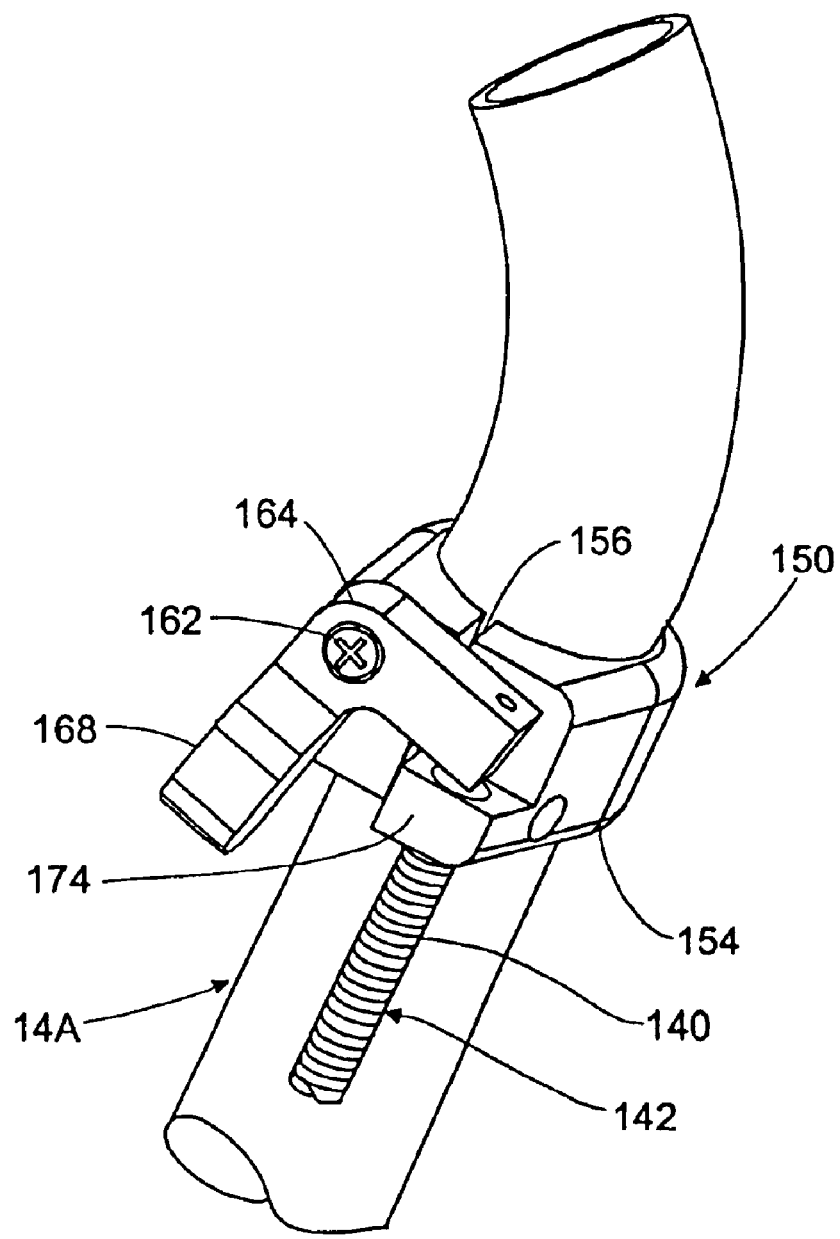
FIG. 9 is a perspective view illustrating the trigger mechanism and cable for releasing the lock mechanism.

Referring to FIGS. 4–6 and 8, each of the front struts 10A and 10b has tubular end sections 48A and 48B, each of which is characterized by flat opposite facing surfaces 50 and 51 (FIG. 4), and circularly curved end surfaces 52. Preferably but not necessarily, like the struts 8A and 8B, the body sections 54 of the forward struts 10A and 10B have a circular cross-sectional configuration. Referring also to FIGS. 8 and 9, the inner end sections 48B of each of the struts 10A and 10B is provided with a flange 56 which projects laterally of the strut and has a flat top surface 58. The bottom surface of flange 56 is an extension of the flat bottom surface 51 of end section 48B. The flange 56 has a circularly curved edge surface 60 which extends through an angle of at least 90° as shown. However, this circular edge surface is interrupted by two circularly curved notches 62 and 64. The notches 62 and 64 are of like size and serve to interlock with a lock plunger 114 described in greater detail hereinafter. The two end sections of each of the struts 10A and 10B are also formed with circular pivot holes 68 and 70 which are centered on the axis of the strut.

Referring to FIGS. 4–7, the end sections 48B of front struts 10A and 10B are connected to the plates 18A and 18B by means of cylindrical pivot pins 74 which are seated in the counterbores 44 of plates 18A and 18B. The pins 74 are locked in place because of their being seated in the counterbores 44 and because the plates 18A and 18B are fixed relative to one another because of being secured to carrier 20 by means of screws 34. Thus, the carrier 20 acts not only as an interface with bicycle stem 4 but also as a means of connecting the plates 18A and 18B so that they can hold in place the pivot pins 74. Preferably, as shown, flanged bushings 80A and 80B are disposed in the opposite ends of holes 70 and the pins 74 fit within and project from those bushings. The bushings are made of a suitable low friction material to assure an easy pivoting action for the front struts.

Referring now to FIGS. 3–7, the handlebar mounts 12A and 12B are formed with bores 80 which are sized to make a tight non-slip fit with the handlebars 14A and 14B. The mounts 12A and 12B have laterally extending flanges 86 and 88 that are provided with holes 90 and 92 for use in making pivotal connections to the struts 8A, 8B and 10A, 10B respectively. The holes 90 in the upper flanges 86 are threaded. The rear struts 8A and 8B extend between flanges 86 and 88 and are secured to the handlebar mounts 12A and 12B by means of long pivot pins 94 (FIGS. 5 and 6) which have threaded ends. Pins 94 extend through the holes 43 in the outer end sections 40B of the struts 8A and 8B and through the holes 90 of flanges 88 and are screwed into the threaded holes 90 in flanges 86. Similarly, the outer ends of the struts 10A and 10B extend between and are pivotally secured to the flanges 86 and 88. The connections to the outer ends of the struts 10B is made by means of hollow internally threaded flanged pivot studs 96, additional pairs of bushings 80A and 80B, and screws 98. The bushings are mounted in the upper and lower ends of the holes 68 in the outer sections of the forward struts and are sized to accept the pivot stud 96. Screws 98 are screwed into the studs 96 to secure the pivot connections of the struts to the handlebar mounts.

It is to be noted that the lengths of the front and rear struts and the pivot points of those struts are set so that a parallel linkage relationship is established. As seen in FIG. 1 where the handlebar assembly is in its outboard position, the struts 8A and 10A are substantially parallel to one another. The same is true of struts 8B and 10B. This parallel relationship is maintained as the handlebars are moved to the inboard position (FIG. 2).

Referring now to FIGS. 1, 3 and 5–7, attached to the inner sections of each of the struts 10A and 10B are gear segments 100. The latter have a circularly-curved inner surface 102 and a circularly-curved outer surface which is provided with a plurality of gear teeth 104. The gear teeth on the two segments 100 have a like pitch and shape. Each of the gear segments 100 also is formed with a pair of holes 106 to accept small threaded pins (not shown) which are used to secure the gear segment to the flange portion 56 of the strut 10A or 10B. In this connection, as shown in FIG. 8, each of the struts 10A and 10b is provided with a pair of tapped holes 110 into which the threaded pins (not shown) are screwed to secure the gear segments. The inner surface 102 of the gear segment engages the curved surface 52 of the strut, so that the segment is effectively supported by that surface against forces tending to thrust it radially toward its pivot axis. The two gear segments 100 are sized so that their gear teeth are engaged with one another, as shown in FIGS. 1 and 3. Consequently, this interaction of the teeth of the two gear segments 92 assures that the handlebars will pivot in unison with one another. The gear teeth on each gear segment extend through an angle of 90°, although a slightly greater or lesser angle may be acceptable to some users.

Figure 11:
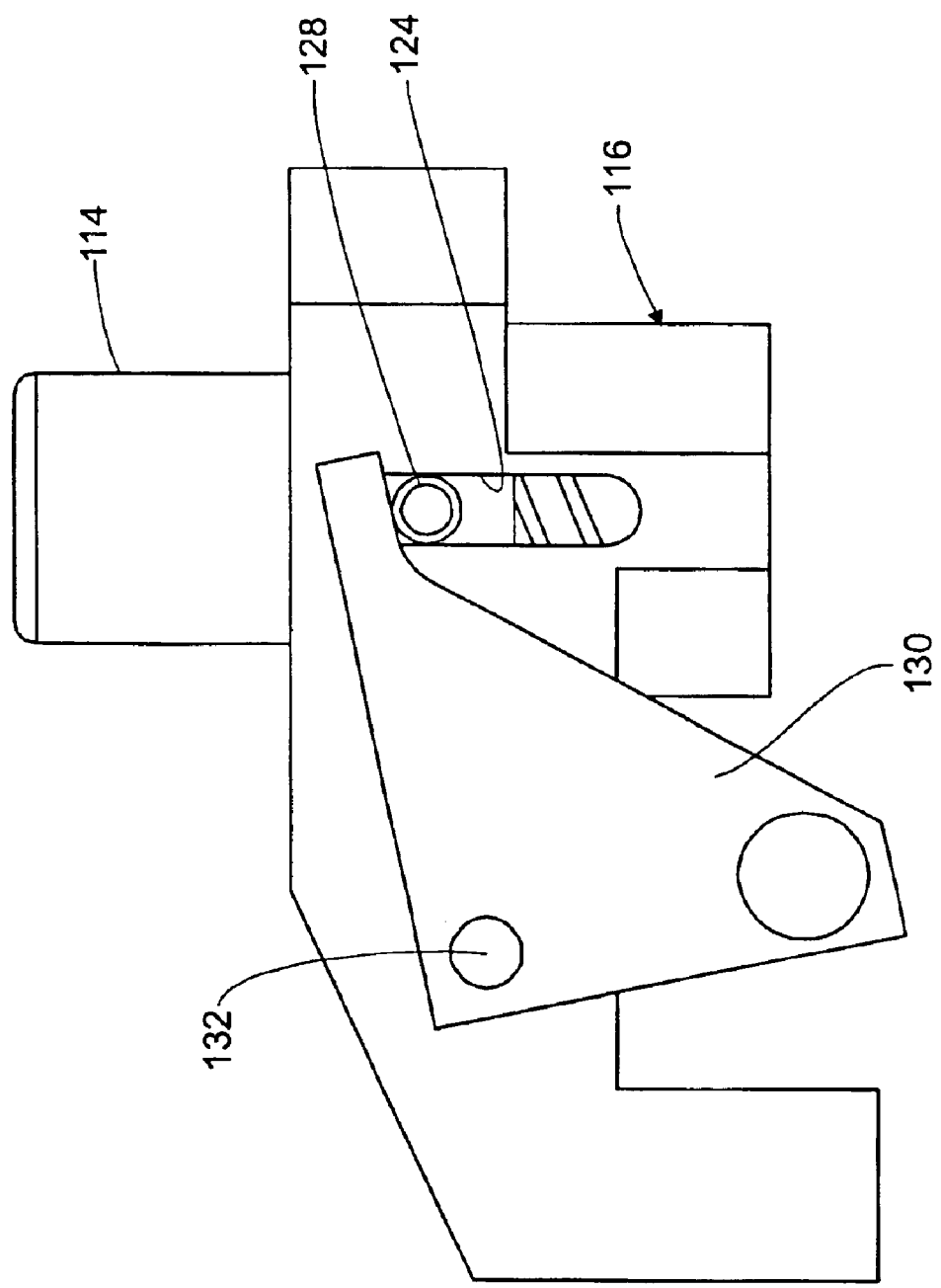
FIG. 11 is a side elevation of the lock mechanism.
Figure 12:
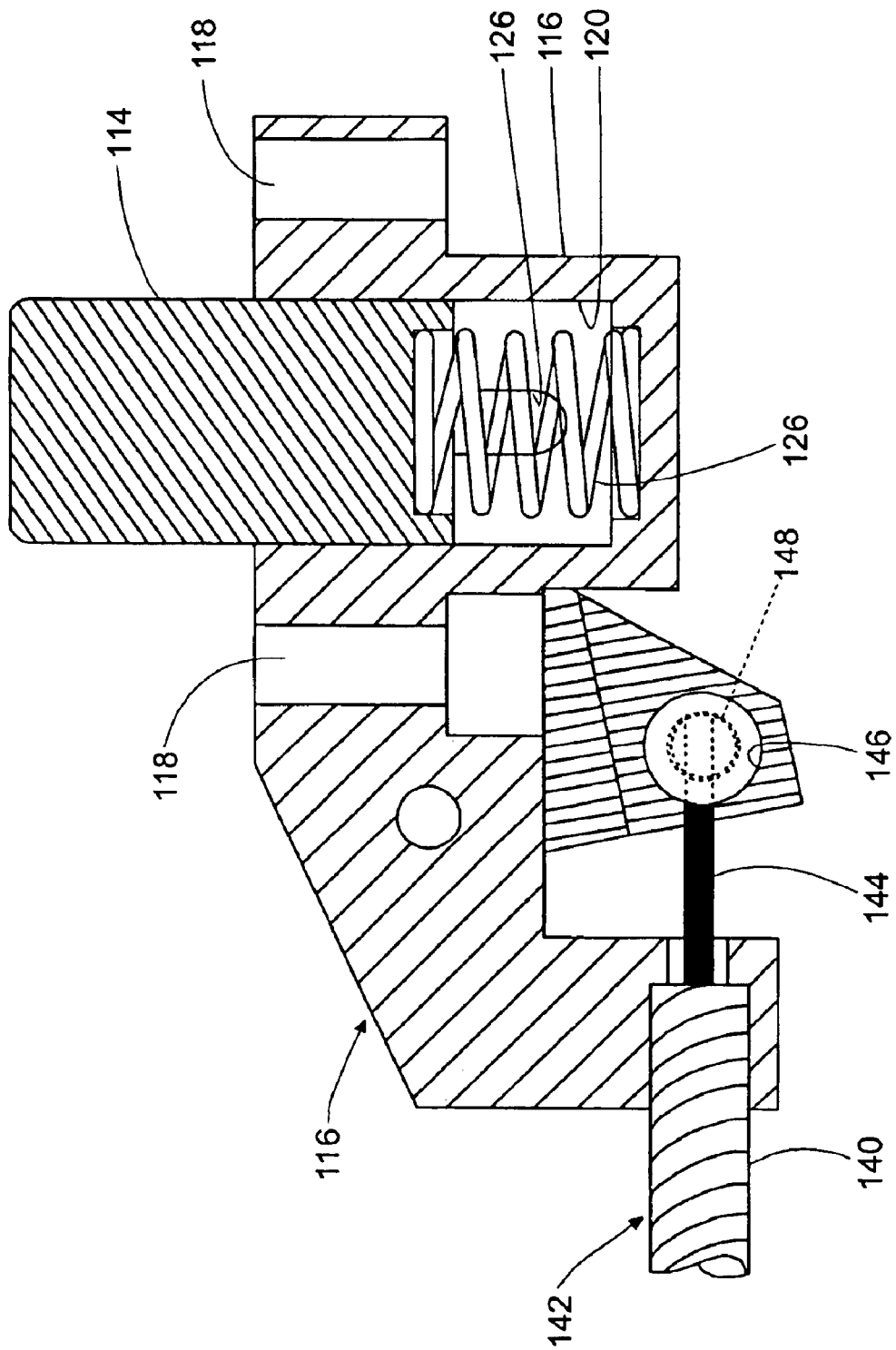
FIG. 12 is a cross-sectional view of the lock unit.

Referring again to FIGS. 4–7, the plates 18A and 18B are also provided with a hole 112 that is located between the pivot holes 44. The hole 100 is provided to accommodate a plunger 114 (FIGS. 6, 7, 11, 12) that is sized to make a close sliding fit in notches 62 and 64. The plunger is part of a lock assembly which comprises a body member 116 having openings 118 to accommodate screws (not shown) whereby it is attached to the bottom mounting plate 18B. The body has a blind hole 120 which is intersected by a pair of aligned side holes 124. Plunger 114 and a compression spring 126 are mounted in hole 120. Projecting from the opposite sides of plunger 114 are two studs 128 that extend into and make a close sliding fit in side holes 124. The length of holes 124 determines the length of travel of plunger 114. Pivotally attached to body 110 is an actuating member 130. The latter is attached to the body via a pivot pin 132 and is bifurcated so as to provide two parallel mutually spaced elongate fingers 134 (only one is visible in FIG. 11) that extend along opposite sides of the body and overlie and engage the studs 128. Body 116 has another hole 136 in which is anchored the outer sheath 140 of an operating cable 142 that also includes a wire 144 slidably disposed in sheath 140. The wire 144 extends into a blind hole 146 in actuating member 130 where it is secured by a suitable set screw 148 that is screwed into that open end of hole 146.

Figure 10:
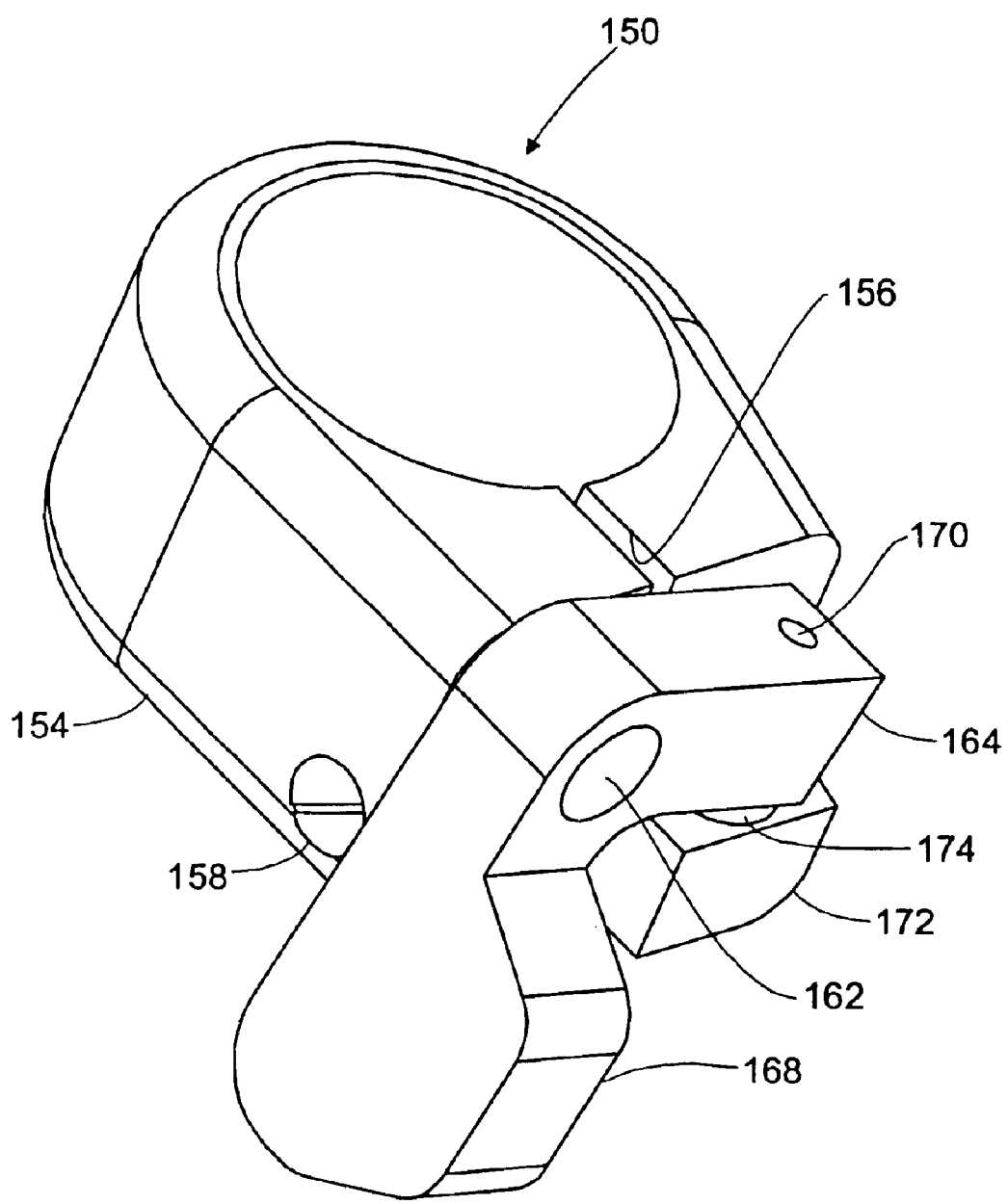
FIG. 10 is an enlarged perspective view of the trigger subassembly.

The other end of the operating cable 142 is connected to a trigger mechanism 150 which is mounted to one of the handlebars 14A (FIGS. 1, 3). As shown in FIGS. 9 and 10, the trigger mechanism 150 comprises a body member 154 in the form of a collar which is split as shown at 156 so that it can be compressed tightly in a gripping relation with the handlebar by means of a screw 158 which extends through a hole in one part of the collar and is screwed into a threaded hole in the other part of the collar. Pivotally attached to one side of the collar by a pivot pin 162 is an L-shaped trigger member 164. One end of trigger 164 is enlarged to serve as a thumb-pressing section or thumb grip 168. The other end has a hole 170 in which the adjacent end of the inner wire member 144 of the cable 142 is secured. The body member 154 has a side extension 172 with a hole 174 into which the sheath 140 of cable 142 is anchored. The compression spring 116 urges plunger 114 to an extended position wherein it protrudes through the hole 112 of plate 18A into one of curved slots 62 or 64. When the handlebars are in their retracted or outboard position, lock plunger 114 protrudes into the slots 62 so as to prevent the bars from moving. Similarly, when the handlebars are in their forward or inboard position, lock plunger 114 protrudes into slots 64 to lock them against movement. When the trigger 164 is depressed, it causes cable 142 to retract plunger 114, whereupon the handlebars are free to be moved from one to the other of their outboard and inboard positions, after which releasing the trigger will cause spring 126 to urge the plunger into whichever ones of the slots 62 and 64 are aligned with it, thereby again locking the handlebars against further movement.

Figure 7:
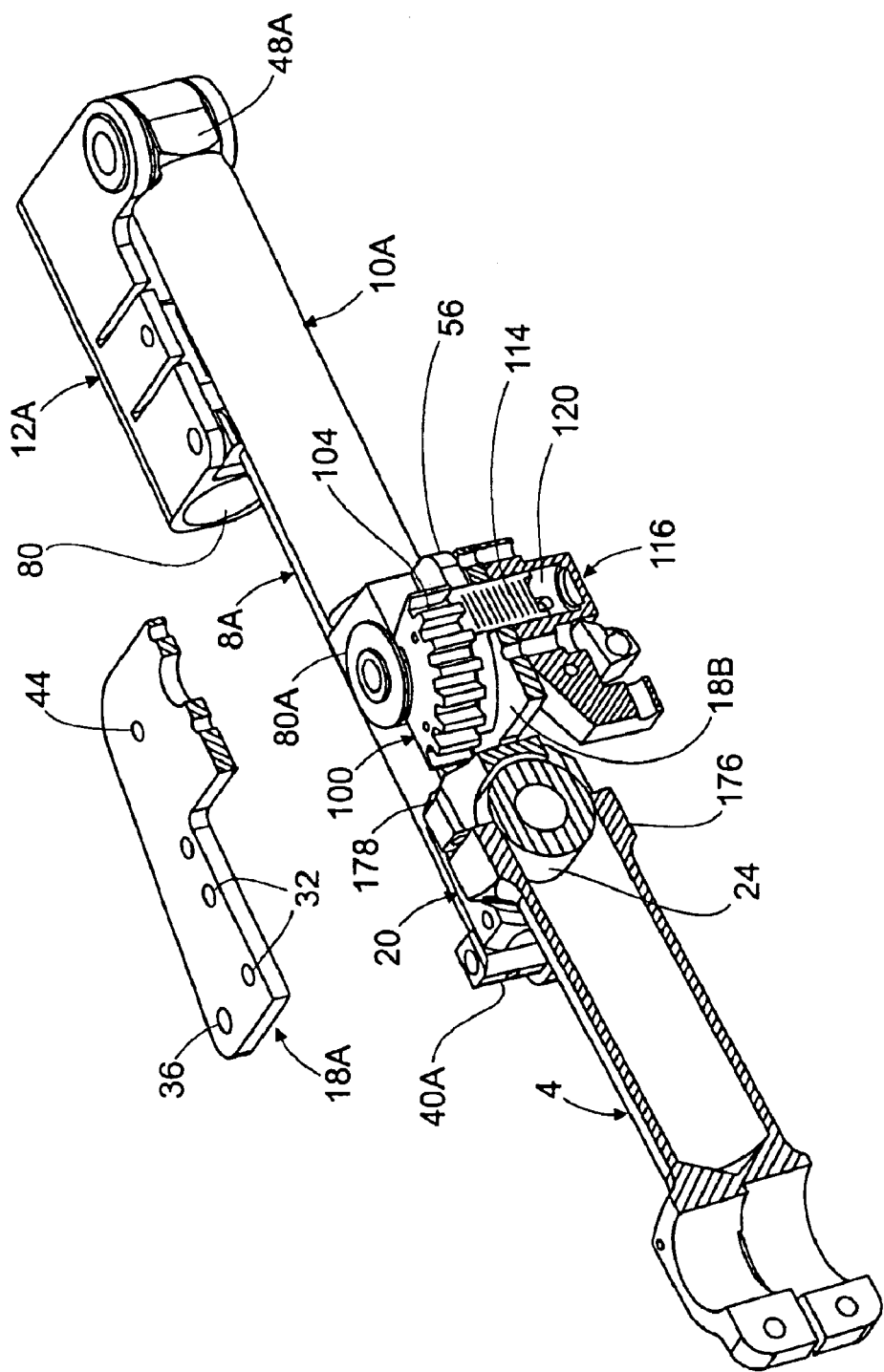
FIG. 7 is a fragmentary perspective view, partly in section and partially exploded, illustrating details of the central support subassembly.

Referring now to FIGS. 6 and 7, the forward end of handlebar stem 4 has a peripheral flange 176 with an inwardly curved front end surface that is engaged with and makes a close fit with the cylindrical center section 24 of carrier member 20. A separately formed clamp member 178 is disposed in slot 22 of plates 18A and 18B. Clamp member 178 has a similarly curved rear surface in engagement with center section 24. Screws (not shown) secure flange 176 to clamp member 178, thereby releasably locking stem 4 to carrier 20.

Figure 14:
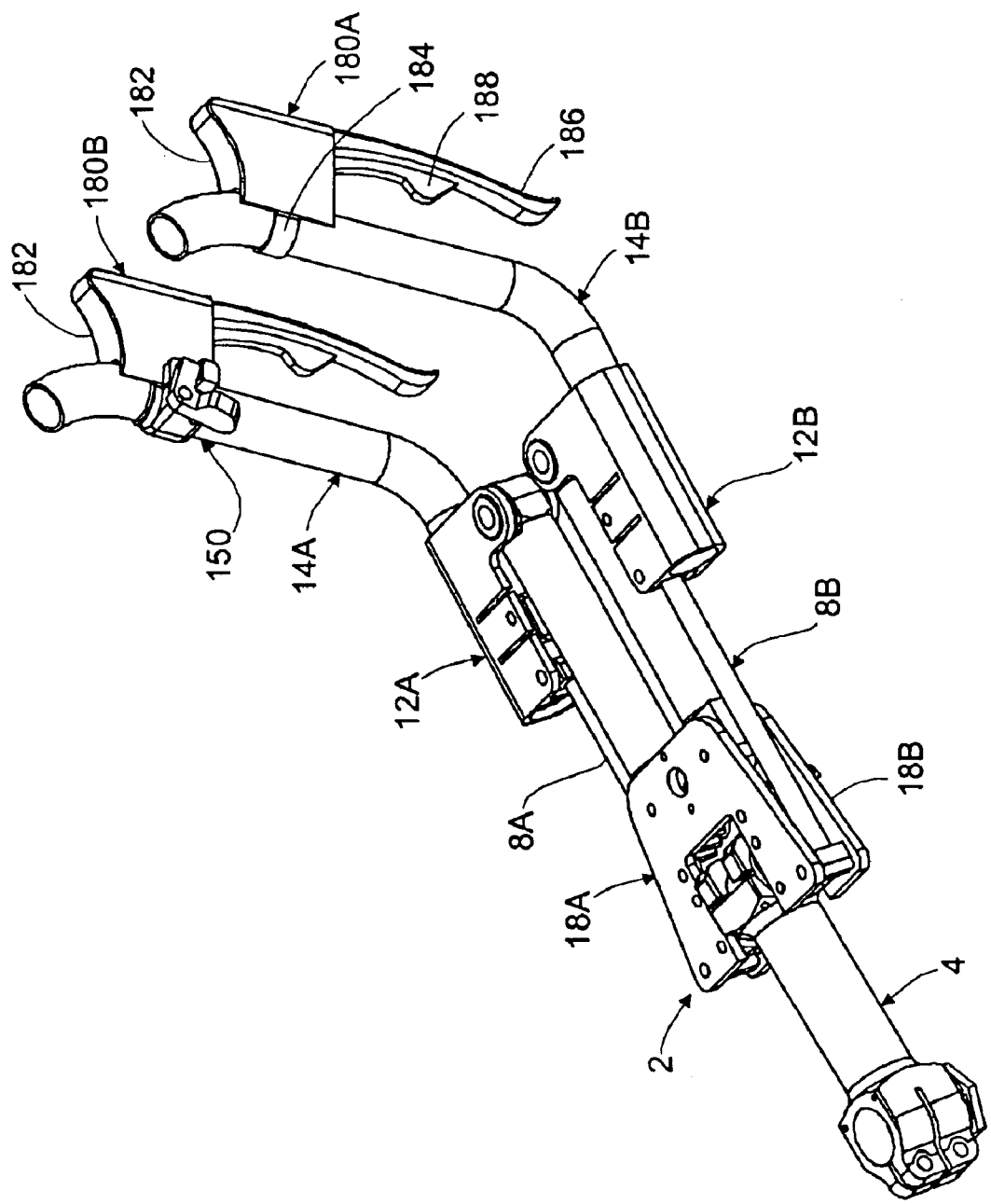
FIG. 14 is a perspective view showing integrated brake/shift lever units mounted on the handlebars.

FIG. 14 serves to establish that brake levers and gear shift levers may be carried by the handlebars and also helps to illustrate a significant advantage of the invention over the pivoting handlebar structure disclosed by U.S. Pat. No. 5,737,967, issued 14 Apr. 1998 to James T. Hartley. In this view a combination brake/gear shift lever unit 180A is attached to handlebar 14B. Combination brake/gear shift lever units are well known, being available commercially from Campagnolo SRL of Vincenza, Italy and Shimano Inc. of Osaka, Japan. The combination unit 180A comprises a body member 182 adapted to be removably attached to the handlebar by a strap 184 or other suitable means, a brake lever 186 that is pivotable toward the handlebar, and a shift lever 188 that is pivotable bidirectionally laterally of the handlebar and brake lever 186. More specifically, in the illustrated embodiment, the brake lever pivots in a plane that extends through the handlebar and the shift lever pivots bidirectionally in a plane that is at a right angle to the plane of movement of brake lever 186. However, the structure of the combination brake/gear shift unit is not critical to the invention and a different form of combination brake/gearshift unit may be used. Although not shown it is to be understood that operating cables are connected to and extend between the brake and gear shift levers and brake and gear shift mechanism of the cycle on which the handlebar assembly embodying the invention is mounted. An identical brake/gear shift unit may be attached to handlebar 14A. Alternatively, a similar but modified brake/gear shift unit 180B may be attached to handlebar 14A. In this case, the body member 182 of unit 180B is attached to the trigger mechanism 150 instead of being attached directly to handlebar 14A.

As shown in FIG. 14, the handlebars are in their forward or inboard position and the combination units 180A and 180B are mounted so that their brake levers are located directly in front of the handlebars, i.e., so that the plane of body member 182 extends radially of the handlebars and parallel to the longitudinal axis of stem 4. Because of the parallel linkage relationship of rear struts 8A, 8B and front struts 10A, 10B, when the handlebars are moved to their rearward or outboard position (FIG. 1), the orientation of combination units 180A and 180B relative to the longitudinal axis of the cycle will be unchanged, even though the handlebars have been moved outwardly from that axis. More specifically when the handlebars are in their outboard position, the plane of body member 182 will still be parallel to the axis of stem 4.

Figure 15:
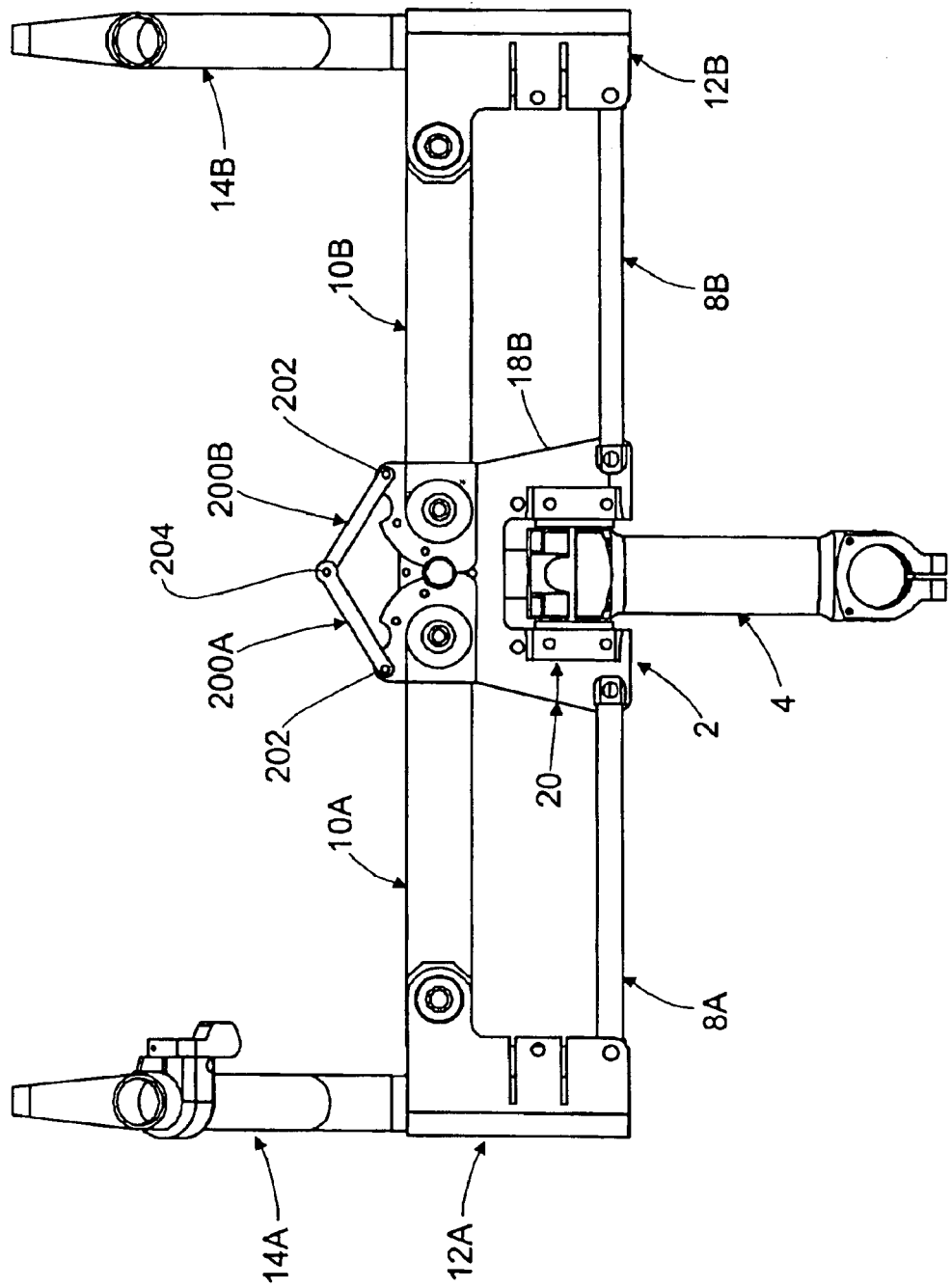
FIG. 15 is a plan view like FIG. 1 of an alternative embodiment of the invention.
Figure 16:
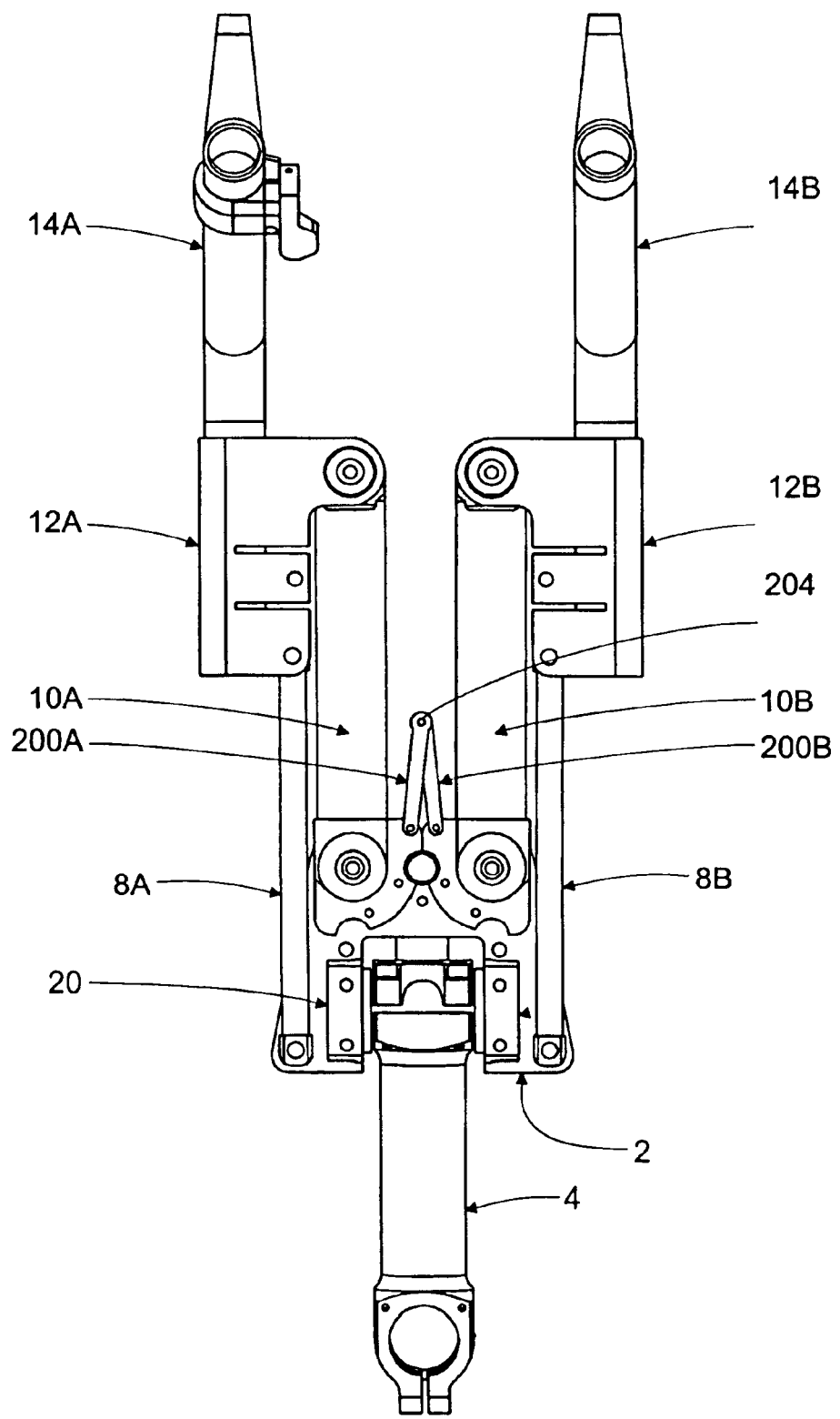
FIG. 16 is a plan view like FIG. 2 of the same alternative embodiment.

FIGS. 15 and 16 illustrate an alternative embodiment of the invention. In this embodiment, the gear segments 100 of the preferred embodiment are omitted and instead a pair of links 200A and 200B are pivotally connected by pivot pins 202 to the end sections 48B of front struts 10A and 10B. At their opposite ends links 200A and 200B are pivotally connected to one another by a pivot pin 204. Links 200A and 200B are of like length and their points of connection to end sections 48B are such that pivot pin 204 lies along the longitudinal axis of stem 4 and the links extend at like angles to struts 10A and 10B. Links 200A and 200B coact to assure that the handlebars move in unison as they are shifted from one to the other of their outboard position (FIG. 15) and their inboard position (FIG. 16).

Although not shown, it is to be understood that arm rests (not shown) also may be mounted to the central support assembly 2 supporting the cyclist's arms when the handlebars are in the forward "aero" position. It is contemplated that the arm rests will be attached by screws directly to the upper plate 18A of the central support assembly 2. It should be noted that the arm rests will be fixed and not interfere with movement of the handlebars as described above.

Obviously the apparatus shown in FIGS. 1–16 may be modified in various ways without departing from the essential principles of the invention. For one thing, separate brake lever units and gear shift lever units may be employed. Also the shape and sizes of various components may be changed. A further modification is to use gear segments 100 that allow the handlebars to move through an angle of greater than 90 degrees, i.e., so that in the outboard position the front and rear struts extend at an acute angle to the longitudinal axis of stem 4. It also is contemplated that the front struts could be provided with an additional notch intermediate notches 62 and 64, so as to provide for three different locked handlebar positions. Another obvious change is to modify how the handlebar stem is secured to the central support assembly. The means for pivotably mounting the rear and front struts also may be modified. For example, the inner end sections of the front and/or rear struts may be bifurcated so as to embrace the bottom plate 18B, in which case the pivot pins for the bifurcated ends will be connected to the bottom plate 18B but not the upper plate 18A. A further possible modification is to provide two flexible covers for the two sides of the handlebar assembly, each cover being in the form of a flat tube that extends around and covers one pair of front and rear struts and the space between those struts. Still other modifications will be obvious to persons skilled in the art.

The invention has numerous advantages. One important advantage is that the parallelogram linkage assures a constant orientation of the brake and shift levers as the handlebars are shifted from one to the other of their inboard and outboard positions. A second important advantage is the presence of a lock mechanism for locking the handlebars against swinging movement. Still other advantages are ease of use, sturdy construction, ease of assembly and disassembly, and compatibility with conventional bicycle architecture. A further advantage is that the invention is not limited to any particular kind of cycle. Still other advantages will be obvious to persons skilled in the art.

What is claimed is:

1. A pivoting handlebar assembly for a bicycle comprising:
   a central support subassembly;
   a pair of front struts and a pair of rear struts, with each strut having first and second opposite ends;
   said rear struts having their first ends pivotally attached to the central support subassembly;
   said front struts having their first ends pivotally attached to the central support subassembly in spaced relation to the first ends of the rear struts;
   gear means attached to the first ends of the front struts and engaged with one another so as to assure that the front struts will pivot in unison with one another relative to the central support subassembly; and
   first and second handlebar mounts and first and second handlebars attached to said first and second handlebar mounts respectively, means for pivotally connecting said second ends of one of the rear struts and one of the front struts to said first handlebar mount with said second end of said one front strut being spaced from said second end of said one rear strut, and means pivotally connecting said second ends of the other rear strut and the other front strut to said second handlebar mount with said second end of said other front strut being spaced from said second end of said other rear strut;
   with the two pairs of rear and front struts being pivotable relative to the central support assembly so as to shift the handlebars from one to the other of a rearward and outboard "drop" position and a forward and inboard aerodynamic "aero" position.

2. A pivoting handlebar assembly according to claim 1 further including lock means carried by the central support subassembly for releasably locking the front struts in their outboard or inboard positions.

3. A pivoting handlebar assembly according to claim 1 further including a bicycle steering stem attached to and projecting from said central support subassembly, said stem having an end section that is adapted to be secured to a bicycle front wheel steering shaft.

4. A pivoting handlebar assembly comprising:
   a central support;
   first and second handlebars;
   a parallelogram linkage system comprising first and second front struts and first and second rear struts pivotally connected to and extending between said central support and said first and second handlebars, said linkage system being adapted to allow said first and second handlebars to swing from a first position in which said handlebars are spaced apart a predetermined maximum distance and a second position in which said handlebars are spaced apart a predetermined minimum position, with said first and second front struts being substantially parallel to and spaced from said first and second rear struts respectively in both said first and second positions; and
   means for coupling together said front struts so that pivotal movement of either of said front struts in one direction relative to said central support will cause pivotal movement of the other front strut in an opposite direction relative to said central support and pivotal movement of said first and second rear struts relative to said central support in the same directions as said first and second front struts respectively.

5. A pivoting handlebar assembly for a bicycle comprising:
   a central support;
   first and second handlebars disposed on opposite sides of said central support; and
   a parallelogram linkage system connected to and extending between said central support and said first and second handlebars, said linkage system comprising a first pair of struts each having a first end thereof pivotally connected to said first handlebar and a second opposite end thereof pivotally connected to said central support and a second pair of struts each having a first end thereof pivotally connected to said second handlebar and a second opposite end thereof pivotally connected to said central support, whereby said first and second handlebars may be moved in an arc relative to said central support from a first outboard position in which said handlebars are spaced apart a predetermined maximum distance and a second inboard position in which said handlebars are spaced apart a predetermined minimum position.

6. A pivoting handlebar assembly according to claim 5 wherein each of said first and second pairs of struts comprises a front strut and a back strut, and further including separate gear members attached to said first ends of said front struts so as to undergo rotation on the pivot axes of said first ends of said front struts when said front struts pivot relative to said central support, said separate gear members being engaged with one another so that pivotal movement of one of said front struts causes pivotal movement of the other of said front struts.

7. A pivoting handlebar assembly for a bicycle comprising:
   a central support;
   first and second handlebars;
   first and second front struts each having first and second ends and first and second rear struts each having first and second ends;

first and second pivot means pivotally connecting said first ends of said first and second front struts respectively to said central support and third and fourth pivot means pivotally connecting said second ends of said first and second front struts respectively to said first and second handlebars respectively;

fifth and sixth pivot means pivotally connecting said first ends of said first and second rear struts respectively to said central support and seventh and eighth pivot means pivotally connecting said second ends of said first and second rear struts respectively to said first and second handlebars respectively; and means for coupling said front struts so that pivotal movement of said first front strut relative to said central support requires a simultaneous pivotal movement of said second strut relative to said central support.

8. A pivoting handlebar assembly according to claim 7 wherein said means coupling said front struts comprises first and second mutually cooperating members attached to said first ends of said first and second front struts respectively.

9. A pivoting handlebar assembly according to claim 7 wherein said means coupling said front struts are gear segments that are attached to said front struts and rotate with said front struts as said front struts pivot relative to said central support.

10. A pivoting handlebar assembly according to claim 9 wherein said central support comprises first and second parallel plates in spaced relation to one another, and further wherein said first ends of said front and rear struts extend between said first and second plates.

11. A pivoting handlebar assembly according to claim 10 further including a bicycle steering stem having one end thereof attached to said central support by a shaft that extends transversely of said stem.

12. A pivoting handlebar assembly according to claim 11 wherein said stem has an inwardly curved surface at its front end in engagement with said shaft, and further including clamping means partially surrounding said shaft and secured to said stem, said clamping means releasably holding said shaft in tight frictional engagement with said inwardly curved surface of said stem.

13. A pivoting handlebar assembly according to claim 7 wherein said struts are pivotable relative to said central support and said handlebars so that said handlebars are movable between a first outboard position in which said handlebars are spaced from one another a first maximum amount and a second inboard position in which said handlebars are spaced from one another a second maximum position, with said handlebars extending substantially parallel to one another in both said outboard position and said inboard position.

14. A pivoting handlebar assembly according to claim 13 further including means carried by said central support for releasably locking said handlebars in at least one of said outboard and inboard positions.

15. A pivoting handlebar assembly according to claim 14 wherein said means for releasably locking said handlebars comprises first and second lock members carried by said first and second front struts respectively, and lock means carried by said central support movable into and out of locking engagement with said lock members.

16. A pivoting handlebar assembly according to claim 15 further including selectively operable means for moving said lock means into and out of locking engagement with said lock members.

17. A pivoting handlebar assembly according to claim 16 wherein said selectively operable means comprises an actuating cable, means connecting said cable to said lock means, and manually operable means on said handlebar and connected to said cable for moving said cable.

18. A pivoting handlebar assembly according to claim 1 wherein said front and rear struts form a parallelogram linkage with said handlebar carriers and said central support assembly, whereby said front struts extend parallel to said rear struts in both said rearward and outboard "drop position" and said forward and inboard aerodynamic "aero" position.

19. A pivoting handlebar assembly according to claim 1 wherein said front struts extend substantially in line with one another when said handlebars are in the rearward and outboard "drop" position and extend substantially parallel to one another when said handlebars are in the forward and inboard aerodynamic "aero" position.

20. A pivoting handlebar assembly according to claim 1 wherein said front struts and said rear struts pivot through an angle of substantially 90 degrees relative to said central support when said handlebars shift from one to the other of said rearward and outward "drop" position and said forward and inboard aerodynamic "aero" position.

21. A pivoting handlebar assembly according to claim 4 wherein said first and second front struts each have inner and outer ends with their inner ends pivotally connected to said central support at first and second pivot points respectively, and said first and second rear struts each have inner and outer ends with their inner ends pivotally connected to said central support at third and fourth pivot points spaced from said first and second pivot points, and further including first and second support means supporting said first and second handlebars respectively, with the outer ends of said first front strut and said first rear strut being pivotally connected to said first support means and the outer ends of said second front strut and said second rear strut being pivotally connected to said second support means.

22. A pivoting handlebar assembly according to claim 4 further including first and second mutually engaged gear segments attached to said first and second front struts respectively, whereby when one front strut undergoes pivotal movement said gear means will cause simultaneous pivotal movement of the other front strut.

23. A pivoting handlebar assembly according to claim 7 wherein said central support comprises two parallel and mutually spaced plates and said front and rear struts are pivotally connected to said central support by pivot pins that extend through said two parallel plates, and further including a bicycle steering stem attached to said central support by a shaft that extends transversely to said stem and is disposed between said plates.

24. A pivoting handlebar assembly according to claim 7 wherein said first ends of said front and rear struts are pivotally connected to said central support at different locations.

25. A pivoting handlebar assembly according to claim 23 further including locking means carried by said central support for releasably locking said handlebars in at least one of said outboard and inboard positions, said locking means comprising first and second lock members carried by said first and second front struts respectively, lock means carried by said central support and movable into and out of locking engagement with said lock members, and selectively operable means for moving said lock means into and out of locking engagement with said lock members, said selectively operable means comprising an actuating cable, means connecting said cable to said lock means, and manually operable means connected to said cable for moving said cable.

26. A pivoting handlebar assembly according to claim 10 wherein said gear segments also extend between said first and second plates.

* * * * *

UNITED STATES PATENT AND TRADEMARK OFFICE
CERTIFICATE OF CORRECTION

PATENT NO. : 6,945,136 B2
DATED : September 20, 2005
INVENTOR(S) : Peter M. Nielsen It is certified that error appears in the above-identified patent and that said Letters Patent is hereby corrected as shown below:

Column 7,
Line 57, insert -- for -- before "pivotally".

Signed and Sealed this

Twenty-second Day of November, 2005

JON W. DUDAS
*Director of the United States Patent and Trademark Office*